(12) United States Patent
Heigl

(10) Patent No.: US 6,398,253 B1
(45) Date of Patent: Jun. 4, 2002

(54) GAS BAG PROTECTIVE DEVICE

(75) Inventor: Jürgen Heigl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/652,182

(22) Filed: Dec. 18, 2000

(30) Foreign Application Priority Data

Sep. 1, 1999 (DE) .................................. 299 15 364 U (51) Int. Cl.[7] .......................... B60R 21/22; B60R 21/24
(52) U.S. Cl. .................. 280/729; 280/730.2; 280/743.2
(58) Field of Search ........................... 280/730.2, 743.2, 280/729, 730.1, 743.1, 728.1

(56) References Cited

U.S. PATENT DOCUMENTS

| | | | | |
|---|---|---|---|---|
| 5,651,395 A | * | 7/1997 | Graham et al. | 280/728.1 |
| 5,899,491 A | * | 5/1999 | Tschaeschke | 280/730.2 |
| 5,941,564 A | * | 8/1999 | Acker | 280/743.2 |
| 6,010,149 A | * | 1/2000 | Riedel et al. | 280/730.2 |
| 6,129,377 A | * | 10/2000 | Okumura et al. | 280/730.2 |

FOREIGN PATENT DOCUMENTS

| | | |
|---|---|---|
| DE | 69026933 T2 | 8/1990 |
| DE | 4100738 A1 | 7/1992 |
| DE | 4226954 A1 | 2/1994 |
| DE | 4324487 A1 | 1/1995 |
| DE | 29916700 U1 | 3/2000 |
| DE | 29919574 U1 | 4/2000 |

* cited by examiner

Primary Examiner—Peter C. English
(74) Attorney, Agent, or Firm—Tarolli, Sundheim, Covell, Tummino & Szabo L.L.P.

(57) ABSTRACT

The invention relates to a gas bag protective device comprising a gas bag made of at least two opposite fabric layers (15, 17), which delimit at least one chamber (25 to 33) able to be filled with gas, the fabric layers (15, 17) consisting of warp- and weft threads (19, 119, 21, 121). The gas bag has, in addition, at least one spacer (43) which is connected with the fabric layers (15, 17) and in the inflated state limits the spacing of the fabric layers (15, 17) from each other. In addition, at least two anchoring points are provided on the gas bag, at which it is to be fastened to the vehicle and between which it is tensioned in the inflated state. The gas bag is characterized in that the spacer is provided on a straight connecting line of anchoring points and brings about a tensioning of the gas bag between the anchoring points. In addition, the spacer (43) is formed by some of the warp- and/or weft threads (119) which, in relation to the inflated state, leave the area formed by their associated fabric layer (15, 17) and extend in the direction toward the opposite fabric layer (17 and 15, respectively) and are connected with warp- and/or weft threads (19, 21) of the opposite fabric layer (17 and 15, respectively).

30 Claims, 10 Drawing Sheets

GAS BAG PROTECTIVE DEVICE

BACKGROUND OF THE INVENTION

The invention relates to a gas bag protective device comprising a gas bag made of at least two opposite fabric layers, which delimit at least one chamber which is able to be filled with gas, the fabric layers consisting of warp- and weft threads, the gas bag having at least one spacer which is connected with the fabric layers and in the inflated state limits the spacing of the fabric layers from each other and having at least two anchoring points on which it is to be fastened to the vehicle and between which it is tensioned in the inflated state.

A gas bag protective device is known for example from the U.S. Pat. No. 5, 464,250. Acting as a spacer here is a fabric section running in a zig-zag shape, which is sewn to the fabric layers at the edge sections. This spacer brings it about that the gas bag does not bulge out too much, i.e. it does not assume too great a thickness between its edges. Other types of spacer are so-called tethers which are sewn at their ends to the fabric layers and limit the spacing locally. The mounting of spacers is very expensive and costly and impedes the turning over of the gas bag after sewing. The arrangement of the spacers is therefore very complicated and, for manufacturing reasons, is not possible at any desired location. On the other hand, the inflated gas bags would become unnecessarily thick without the spacers, which raises problems. The optimum restraint requires, in part, no extreme thickness of the gas bag, so that only unnecessarily too much gas is needed to fill the gas bag so that it is taut. In addition, with an increasing thickness, the danger is also increased for the occupant to be hit by the unfolding gas bag.

For this reason, side gas bags, so-called window bags, are produced, which have numerous parallel, narrow chambers. Here, the fabric layers are woven with each other in one piece on the outer periphery of the gas bag and between the chambers. The numerous, in part elongated chambers, having a low cross-section, can increase the inflation time of the gas bag. In addition, they require an exact conducting of gas to the chambers themselves, e.g. a gas lance which extends along the roof frame.

From the U.S. Pat. No. 5,322,322 a tube-shaped, elongated gas bag is known, which in the inflated state extends obliquely upwards from the lower region of the A-column up to the roof frame in the region of the rear passenger. The fabric material which is used runs here approximately at 45° to the longitudinal extent, in order to achieve a shortening and tensioning effect. Owing to this thread path, the gas bag can distinctly expand in cross-section on inflation and can become shortened in longitudinal direction. Through the intensive expansion and through the extreme movement of the threads, a second gas bag housed in the actual gas bag must provide for the necessary gas-tightness.

SUMMARY OF THE INVENTION

The invention provides a gas bag protective device with a gas bag which is distinguished by spacers which are extremely simple and cheap to produce, the spacers also providing for the tensioning and affecting the flow within the gas bag less than bags known hitherto. In addition, the gas bag according to the invention is distinguished in that the spacers can be provided at any desired sites and in any desired number, without making the production of the gas bag distinctly more expensive or difficult. This is achieved in a gas bag protective device of the type initially mentioned in that the spacer is provided on an imaginary straight connecting line of anchoring points and brings about a tensioning of the gas bag between the anchoring points, the spacer being formed by some of the warp- and/or weft threads which, in relation to the inflated state, leave the area formed by their associated fabric layer and extend in the direction toward the opposite fabric layer and are connected with warp- and/or weft threads of the opposite fabric layer. In the gas bag according to the invention, the spacer is formed by some warp- and/or weft threads which leave the fabric composite, as it were, and extend in the direction toward the opposite fabric layer. The spacer is therefore not a separate part to be fastened to the fabric layers, but rather it is an integral component of the fabric layers. The technique of partially weaving fabric layers with each other allows the spacers to be positioned at any desired sites. Furthermore, the individual warp- and/or weft threads, in the region in which they act as spacers, only slightly impede the flow within the gas bag, because it is not compulsory for them to be constructed as a two-dimensional fabric in the region of the spacer. Thus the gas can flow through between the individual threads and lead to a rapid unfolding of the gas bag. By the cheap and variable technique of weaving with each other in one piece, through the invention for the first time almost mattress-like gas bags having a large area can be produced at a favorable cost. The spacer or spacers provide for a shortening of the gas bag in the region of the straight connecting line by threads, as viewed in a section along the straight connecting line, leaving the fabric composite in the direction toward the interior of the gas bag, whereby a longer distance for the threads is produced than for threads which do not leave the fabric composite.

The warp- and/or weft threads functioning as spacers, after leaving the area formed by their associated fabric layer (usually the outer wall of the gas bag) and after formation of the spacer, can merge into the opposite fabric layer, hence becoming an integral component of this fabric layer. In addition, however, after formation of the spacer, the spacers can run back again to the fabric layer associated with them and merge integrally into it. Then, however, they must be connected in the region of the spacer with warp- and/or weft threads of the opposite fabric layers. This can be achieved for example in that also from the opposite fabric layer, warp- and/or weft threads emerge from the composite and become connected between the two outer walls of the gas bag with the warp- and/or weft threads emerging from the fabric composite of the opposite fabric layer.

In this way, for example, spacers can be produced which form an H-, X- or Y-shape in cross-section.

The warp- and/or weft threads which form the spacer are missing in the region of the spacer in the fabric layer associated with them. The fabric layer therefore becomes less gas-tight at this point. This can be used deliberately to give the gas bag outer wall a predetermined gas permeability. When, however, the gas permeability becomes too great, the fabric layer which makes available the warp- and/or weft threads, can also be coated at least in the region of the spacer. Inter alia in side gas bags which are to be filled so as to be taut as long as possible, the fabric layers are preferably coated externally with a foil. In so doing, also numerous spacers can be provided, because it is no longer disadvantageous with respect to the gas permeability through coating with a foil that the outer wall only has a few threads in the region of the spacers. The fabric itself therefore forms substantially only a support structure and the actual gas-tightness is achieved by the foil.

When the gas bag is a side gas bag having a large area and has several chambers which are formed by weaving the opposite fabric layers in one piece, in addition the spacers described above are provided inside the chambers. Although the chambers themselves have a small cross-section, the thickness of the gas bag can be further reduced by the spacers and can be reduced to the extent which is sufficient for restraint.

The spacers can run in an elongated manner and, for example, linearly, i.e. can form an elongated, gas-permeable wall. However, the spacers can also be only punctiform or ring-shaped, similar to in the case of a bed mattress, where buttons, visible from the exterior, form the end of spacers.

With respect to the annular construction, it is to be explained in further detail that this annular shape is formed by exit- and/or entry points, at which threads for forming a spacer run from or into a fabric layer, by the exit- and/or entry points complementing each other to form a ring, preferably a circular ring. The fabric layer with the exit-/entry points complementing each other to form a ring has in the inflated state of the gas bag a dome-, cupola- or spherical segment-shaped form. When the exit points lie very close to each other, the ring can be filled, so that the exit points of a spacer complement each other to form a point. In order to achieve a sufficient tensioning effect, preferably numerous successive rings are provided, lying in a row, the row being aligned to the straight connecting line. When a cushion-shaped or mattress-shaped gas bag with a large area is used, several successive rows can be provided, preferably parallel rows of rings. If the rings of adjacent rows are staggered laterally with respect to each other, the gas bag is formed in the region of the spacers by dome-, cupola- or spherical segment-shaped regions even possibly merging into each other.

The protective device according to the invention is preferably a side gas bag protection device to protect the occupant's head, which extends to the side of the occupant's head in the region of his possible sitting postures and largely covers the side window and extends straight across the side window. Along the straight connecting line of the anchoring points which are to be provided at opposite ends of the gas bag, numerous spacers are arranged in series adjacent to each other, the entire section of the straight connecting line in the region of a chamber or of several chambers being formed by numerous spacers which are arranged in series adjacent to each other.

An embodiment makes provision that the warp- and/or weft threads extend parallel to the straight connecting line.

BRIEF DESCRIPTION OF THE DRAWINGS

Further features and advantages of the invention will be apparent from the following description and from the following drawings, to which reference is made. In the drawings.

DETAILED DESCRIPTION OF THE INVENTION

Figure 1:
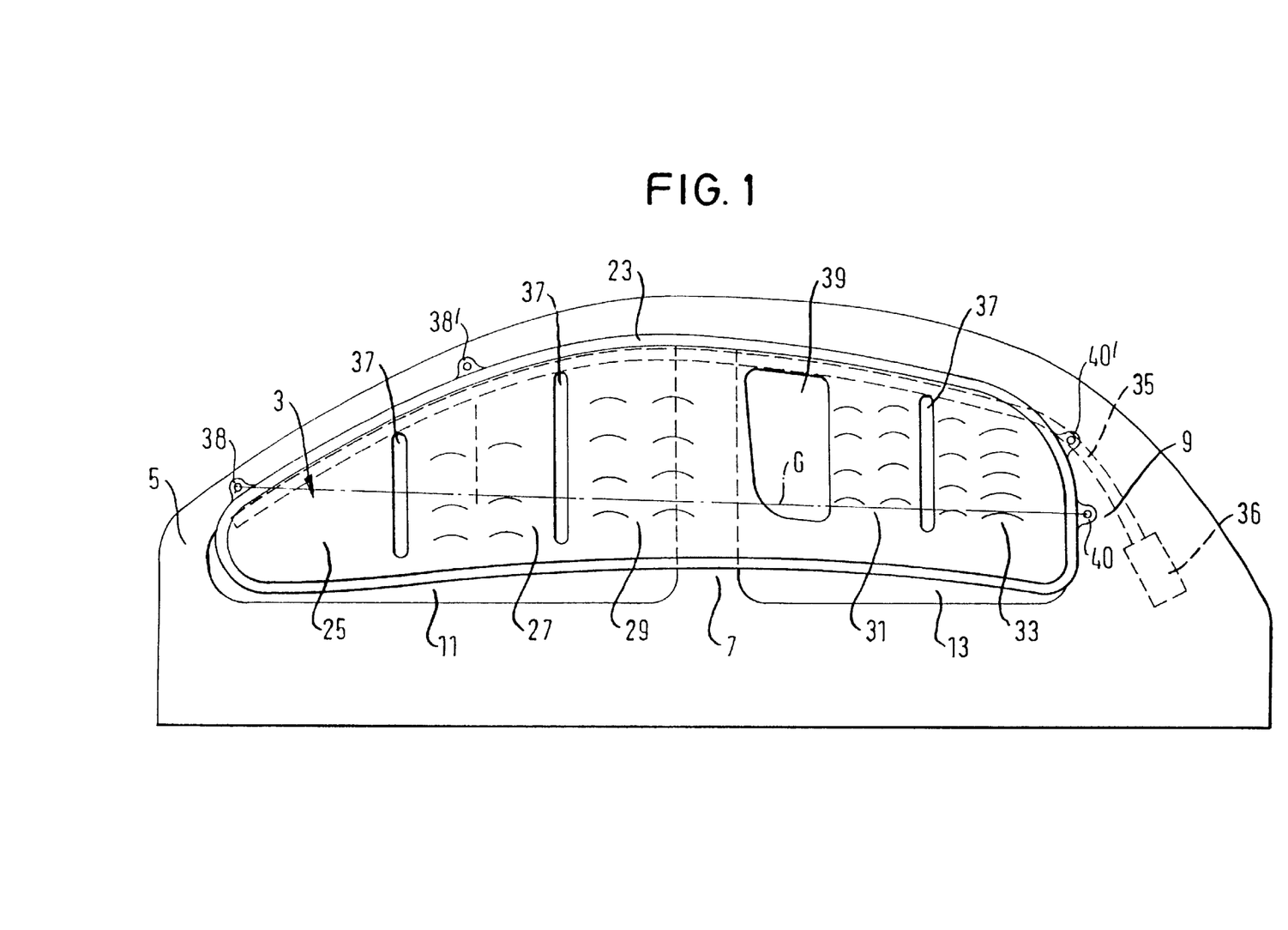
FIG. 1 shows an inflated head/side gas bag protective device according to the invention in accordance with a first embodiment.

In FIG. 1 a gas bag protective device is illustrated with a head/side gas bag 3, which in the inflated state extends in the vehicle from the A-column 5, across the B-column 7 to the C-column 9 and completely covers the side windows 11, 13. The side gas bag 3 is constructed with a large area and mattress-shaped with almost a constant thickness in the inflated state. It consists of two fabric layers 15, 17 which can be seen better in FIG. 2. The fabric layers 15, 17 form the outer walls of the gas bag. Both fabric layers 15, 17 consist of warp- and weft threads 21 and 19, respectively, several warp threads 21 and one weft thread 19 being illustrated by way of example in FIG. 2. The two fabric layers 15, 17 are woven with each other in one piece in the region of the outer periphery 23.

The gas bag consists of several chambers 25 to 33, which are connected with each other in terms of flow at the lower edge of the gas bag. A so-called gas lance 35 extends from the C-column 9, starting from a gas generator 36, into the interior of the gas bag and runs along the roof frame up to the A-column 5. Between the chambers 25 to 33, the fabric layers 15, 17 are woven with each other, likewise in one piece, in the regions 37 which represent dividing walls. The region 39 is interwoven over a large area, likewise represents a dividing wall and is arranged in a region which lies far away from the head of the occupant. The dividing walls 37, 39 are gas-tight, so that they do not allow any flow of gas from one chamber into the adjacent one.

Figure 2:
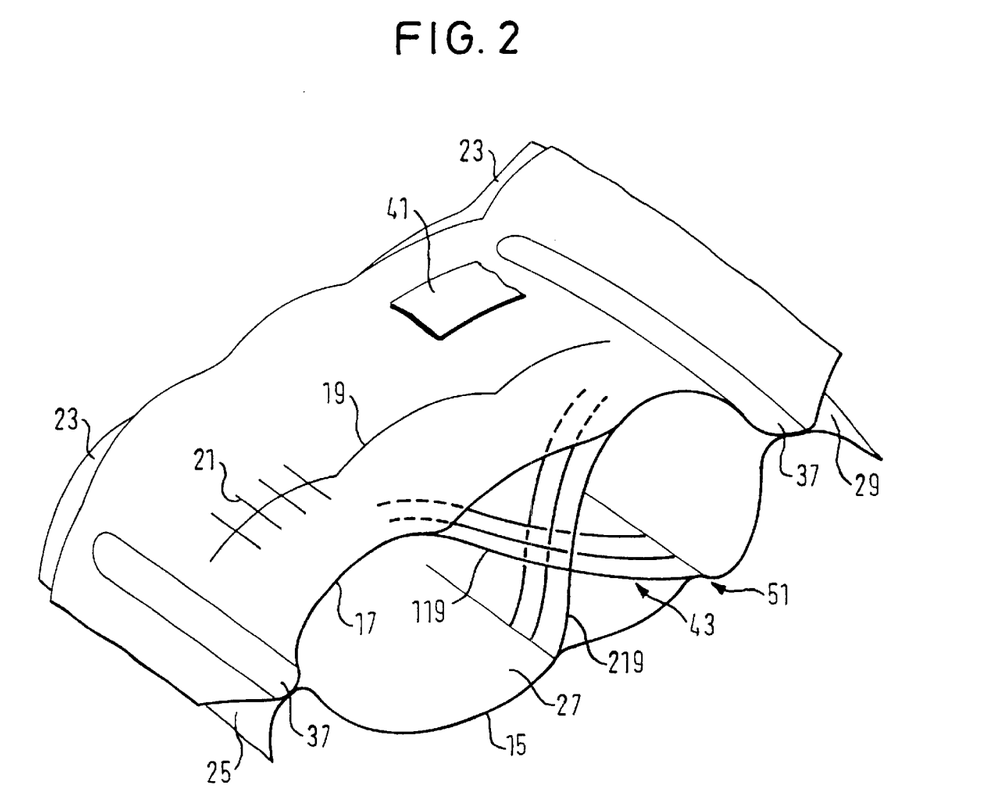
FIG. 2 shows a perspective view of a cut-open individual chamber, of the gas bag shown in FIG. 1, in inflated state.

The gas bag is coated on the outer face of both fabric layers 15, 17 by one foil 41 each, only a small section of the foil 41 being visible in FIG. 2 by way of example. The foil 41 in fact covers the entire outer face of both fabric layers 15, 17. The foil 41 ensures that the gas bag 3 is gas-tight.

On the outer periphery 23, several lug-like extensions are provided, which define anchoring points 38, 38', 40, 40' on the gas bag 3, at which it is fastened to the A-column 5 and to the C-column 9. In the inflated state, the gas bag 3 itself is tensioned between the anchoring points 38 and 40, which are provided at the longitudinal ends of the gas bag 3, and an anchoring can also take place in addition between the anchoring points 38' and 40'. Between the anchoring points 38 and 40, an imaginary straight connecting line G is produced, which runs substantially horizontally and extends straight across the side windows 11, 13. For the tensioning of the gas bag in particular the lower anchoring points 38, 40 are of particular importance, which in addition are provided at the opposite longitudinal ends, because a stable restraint is already produced only through the anchoring along the straight connecting line G and additional fastening points in the region of the roof frame or the upper sections of the A-column 5 or of the C-column 9. It is explained below that the tensioning is achieved solely through a particular form of spacers 43.

It can be seen from FIG. 2 how it is achieved that the gas bag only has a small thickness in the region of each chamber 27 to 33, but nevertheless is tensioned between its fastening points 38, 40. In each chamber at least one spacer or several spacers 43 are arranged, which keep the fabric layers 15, 17 spaced apart. The spacers 43 are formed by threads of the fabric layers 15, 17 which leave the fabric composite on a predetermined distance and finally merge again into the fabric composite of the original fabric layer or of the opposite fabric layer. The spacers 43 are therefore integrated in one piece into the fabric layers 15, 17.

For this, there are illustrated in FIG. 2 by way of example some weft threads 119 from the upper fabric layer. The weft threads 119 run parallel to the straight connecting line G, in relation to the side view according to FIG. 1. The weft threads 119 are further integrated into the fabric layer 17 in the region of the lead line associated with reference number 17. The fabric layer 17 defines an area or, in other words, an outer wall of the gas bag. The weft threads 119, however, then leave the fabric composite and hence the area defined by their associated fabric layer 17, and extend obliquely in the direction toward the opposite fabric layer 15, into which they then merge in the region 51. Vice versa, weft threads 219 from the lower fabric layer 15 are in fact still present in the region of the lead line of reference number 15; however, they leave the fabric layer 15 in the region of the spacer 43 and extend obliquely in the direction toward the opposite fabric layer 17, into which they then finally merge. The weft threads 119, 219 form an "X", viewed in cross-section. The weft threads 119, 219 therefore in fact meet, but are not connected with each other between the fabric layers 15, 17. Through the fact that only individual weft threads 119, 219 leave the fabric layers 17 and 15, respectively, no dividing wall is produced, but a spacer 43 is formed, which runs linearly and parallel to the dividing walls 37 across almost the entire height of the gas bag 3.

Instead of or in addition to the weft threads 19, warp threads 21 can also run out from the fabric layers 15, 17 in the direction of the opposite fabric layer, in order to form a spacer.

As the threads forming the spacers run into the interior and back again into a fabric composite, a shortening effect is produced, which leads to the tensioning of the gas bag straight across the side windows 11, 13.

Figure 3:
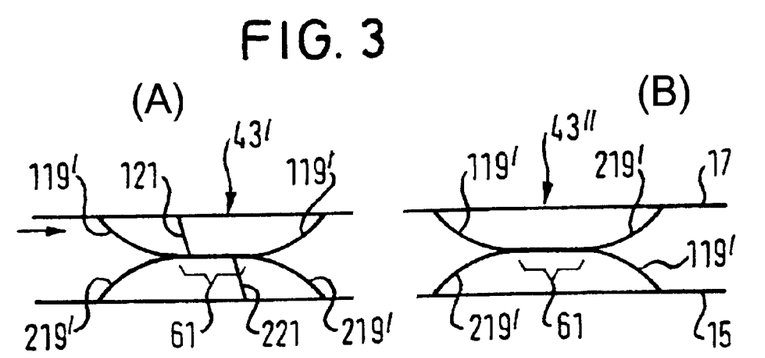
FIG. 3 shows a cross-sectional view through two other embodiments of the invention in the non-inflated state of the gas bag.

FIG. 3 shows two different embodiments of the spacer. In the left-hand embodiment, the spacer 43' is formed in that warp threads 119' from the fabric layer 17 leave the fabric layer 17 (in arrow direction, i.e. described from left to right) and run in the direction toward the fabric layer 15. Likewise, warp threads 219' leave the fabric layer 15 in the direction toward the fabric layer 17. The warp threads 119' and 219' meet and are connected with each other in a region 61, by weft threads 121 from the upper fabric layer 17 and 221 from the lower fabric layer 15 extending into the region 61 and being connected with the warp threads 119', 219', e.g. woven. After the region 61, the warp threads 119', 219' likewise run like the weft threads 121, 221 back again into the fabric layers 17 and 15, respectively, associated with them. In this embodiment, preferably an axially symmetrical structure of the spacer 43' is produced with the axis of symmetry running vertically.

In the right-hand embodiment in FIG. 3, the spacer 43" is formed in that the warp threads 119', 219' run in the direction toward the opposite fabric layer 15 and 17, respectively, are connected with each other in the region 61 but then do not run back to the fabric layer associated with them, but rather to the opposite fabric layer and merge into this fabric layer. For reasons of clarity, in the right-hand embodiment the weft threads 121, 221 are not illustrated, although they are present to create the region 61.

Figure 4:
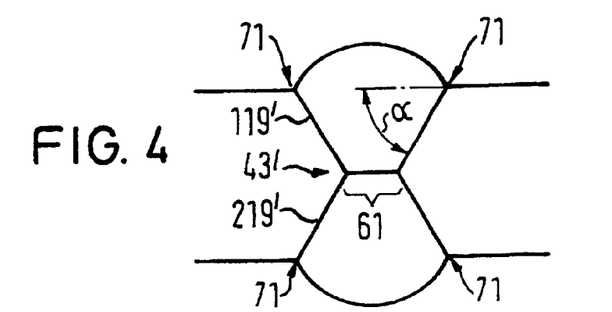
FIG. 4 shows the region of the gas bag shown in FIG. 3 in inflated state.

In FIG. 3 the illustrated section of the gas bag is shown in the non-inflated, but slightly pulled-apart state. In FIG. 4, on the other hand, the gas bag is illustrated in the region of the spacer 43' in inflated state. It can be seen that in the inflated state an H-shape of the spacer 43' is produced, with vertical legs which each run obliquely outwards toward its free ends, and with a connecting leg which is formed by the region 61. Between the exit- or entry points 71, at which the threads provided for forming the spacer run out from or into the fabric layer, the gas bag bulges slightly outwards. As a whole, a type of mattress shape is therefore produced.

Figure 5:
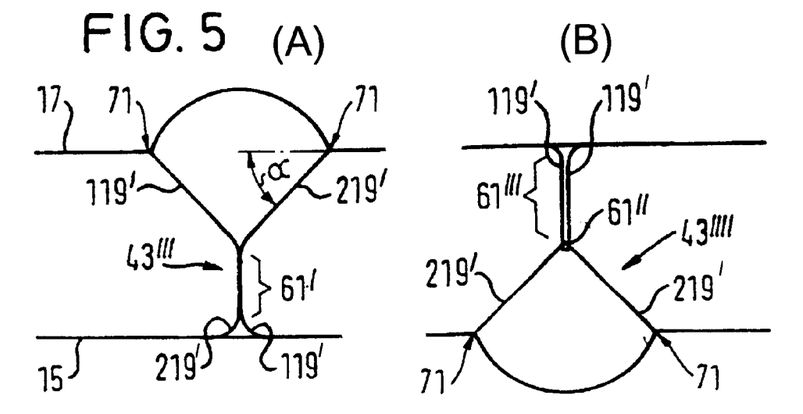
FIG. 5 shows a cross-sectional view through a gas bag in inflated state according to a fourth and a fifth embodiment.

In the embodiment illustrated in FIG. 5, the spacers 43''' and 43'''' have a Y-shape in cross-section. This is formed in that the warp threads 119' emerging from the fabric layer 17 are connected in a region 61' (central web of the Y) with the emerging warp threads 219'. In the V-shaped upper region of the Y, the threads run separated from each other. Then the warp threads 119' merge into the fabric layer 15 and the warp threads 219' merge into the fabric layer 17. The region 61' immediately adjoins the fabric layer 15, only for reasons of clarity the lower end of the section 61' is illustrated slightly pulled apart.

In the right-hand embodiment in FIG. 5, the spacer 43'''' is formed in that the warp threads 119' firstly run in the direction toward the fabric layer 15, where they are connected in a region 61" with the warp threads 219' from the fabric layer 15. Then the warp threads 119' run back again into the fabric layer 17. In both embodiments in FIG. 5, of the left-and of the right-hand embodiment, weft threads are present which assist to define the regions 61', 61" and 61'''. In the right-hand embodiment according to FIG. 5, in addition it must also be ensured that the length of the warp threads 119' is the length of the warp threads 219' in the region taken out from the fabric composite, otherwise the fabric layers would move too much towards each other.

When the embodiments according to FIG. 5 are used, it is to be noted in addition that the number of spacers 43''' or 43'''' is always an even number, because in the region of the spacers an outward curvature of a fabric layer is produced, whereas the other fabric layer is not curved. Thereby, also the wall provided with the curvature is shortened in longitudinal direction. This shortening is only balanced out with an even number of spacers.

Figure 6:
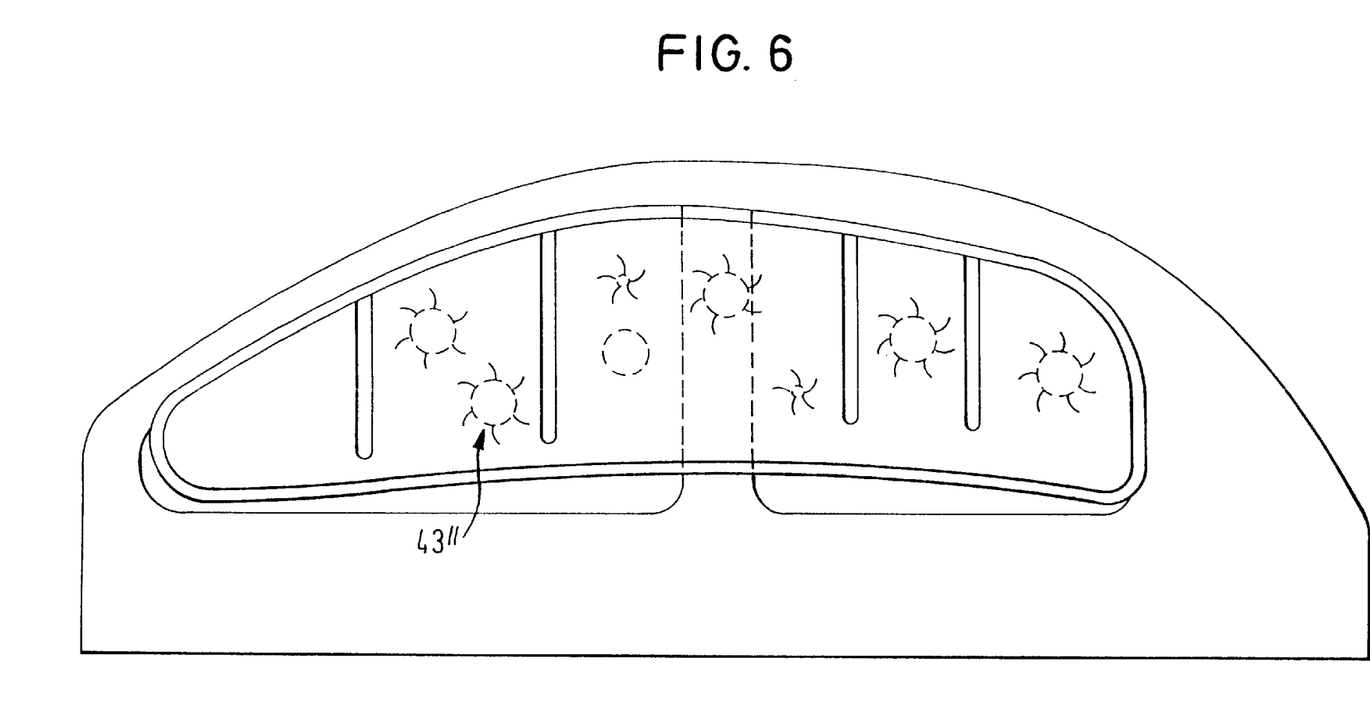
FIG. 6 shows a head/side gas bag protective device in inflated state according to a sixth embodiment.

FIG. 6 is intended to illustrate that the spacers not only have to run in an elongated and linear manner as in FIG. 1, but also for example may run in a punctiform manner or in the form of a circular ring, for example when the embodiments shown in FIGS. 2 to 5 are designed such that the warp- and weft threads emerge from the fabric composite or return into the fabric composite again in the region of a circle. In other words, the entry- arid/or exit points complement each other to form a ring, preferably a circular ring. However, it is to be stressed that through the arrangements of the threads illustrated in FIGS. 2 to 5, any desired geometries of spacers can be produced, by for example in the embodiment according to FIG. 2 the exit- and entry points of the threads complementing each other to form a ring, or in the embodiments according to the FIGS. 3 to 5 by the exit- and entry points together forming straight lines or polygons.

The gas generator and the gas bags are coordinated with each other such that with a fully inflated gas bag the threads forming the spacer emerge from the fabric layer associated with them at an angle α between 35° and 55° (cf. FIGS. 4 and 5), in order to extend in the direction toward the opposite fabric layer.

Figure 7:
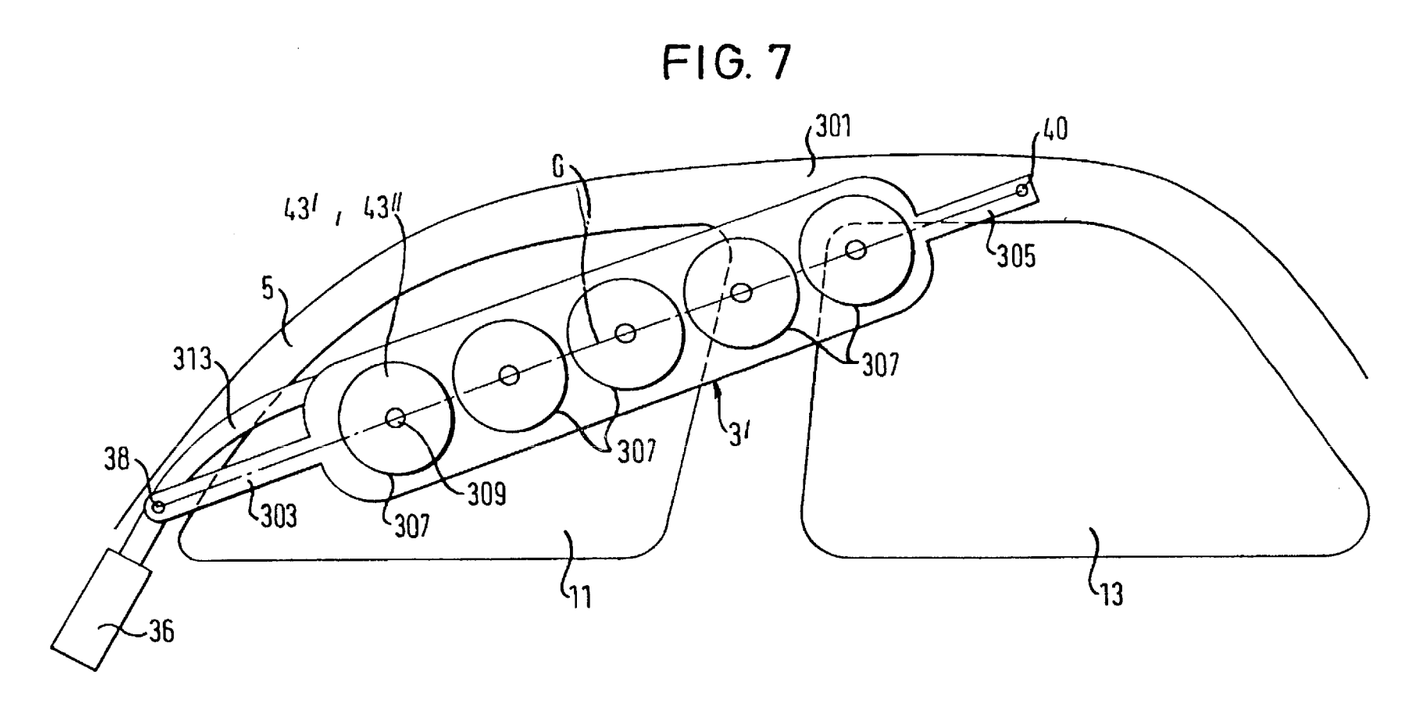
FIG. 7 shows a side view of a head/side gas bag protective device only for the front occupant.

FIG. 7 shows a side gas bag protective device only for the front occupant. The gas bag is constructed in a tube shape and has at its opposite longitudinal ends anchoring points 38, 40 which are fastened to the lower end of the A-column 5 and to the roof frame 301 in the center of the side window 13 for the rear occupant. Anchoring bands 303, 305 connect the gas bag 3' with the anchoring points 38, 40. The anchoring line, which coincides with the straight connecting line G, runs obliquely upwards. Across the entire length of the inflatable region of the gas bag 3', numerous spacers 43' or 43" are arranged in series against each other on the straight connecting line G, the exit- and/or entry points complementing each other to form a circular ring 307, with imaginary mid-points 309 which lie substantially on the straight connecting line G. The rings 307 are not only to be seen on the front face, which is to be seen in FIG. 7, but congruent rings are also provided on the side which faces the side window.

Figure 8:
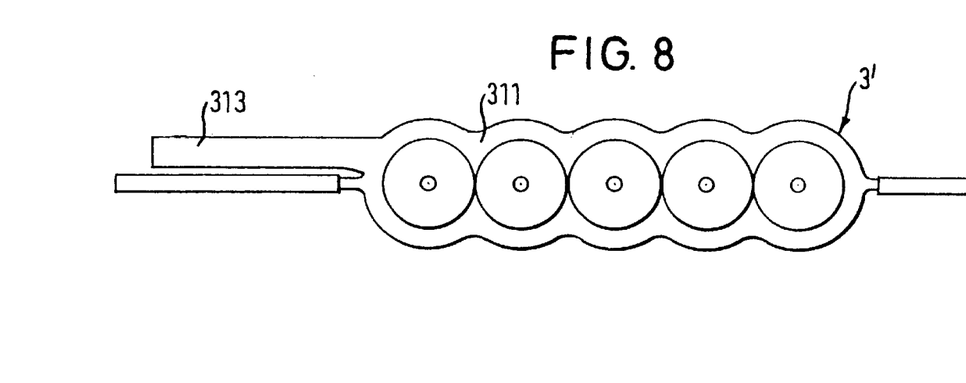
FIG. 8 shows a top view onto the inflated gas bag according to FIG. 7.

Adjacent rings 307 can even contact each other, as FIG. 8 shows. A tube-like extension 313 extends from the inflatable chamber 311 to the gas generator 36, so that no separate connecting tube would have to be provided.

Figure 9:
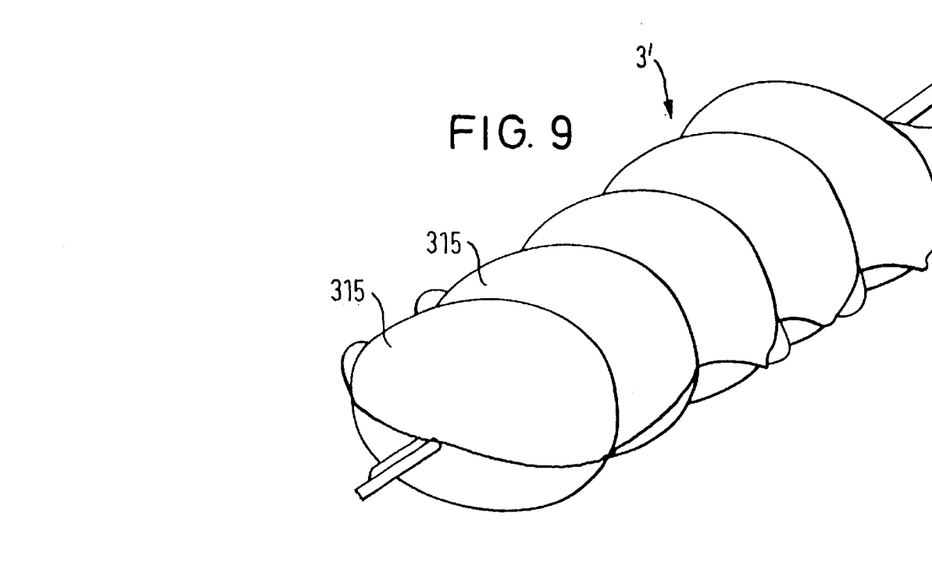
FIG. 9 shows a perspective view of the gas bag according to FIG. 7.

In the inflated state, the gas bag 3' has the shape shown in FIG. 9, which is characterized by successive dome-, cupola- or circular-segment-shaped sections 315 on the two opposite sides, with the dome-, cupola- or circular-segment-shaped sections continuing into each other. This characteristic shape of the sections 315 is achieved by the spacers and the rings 307.

Figure 10:
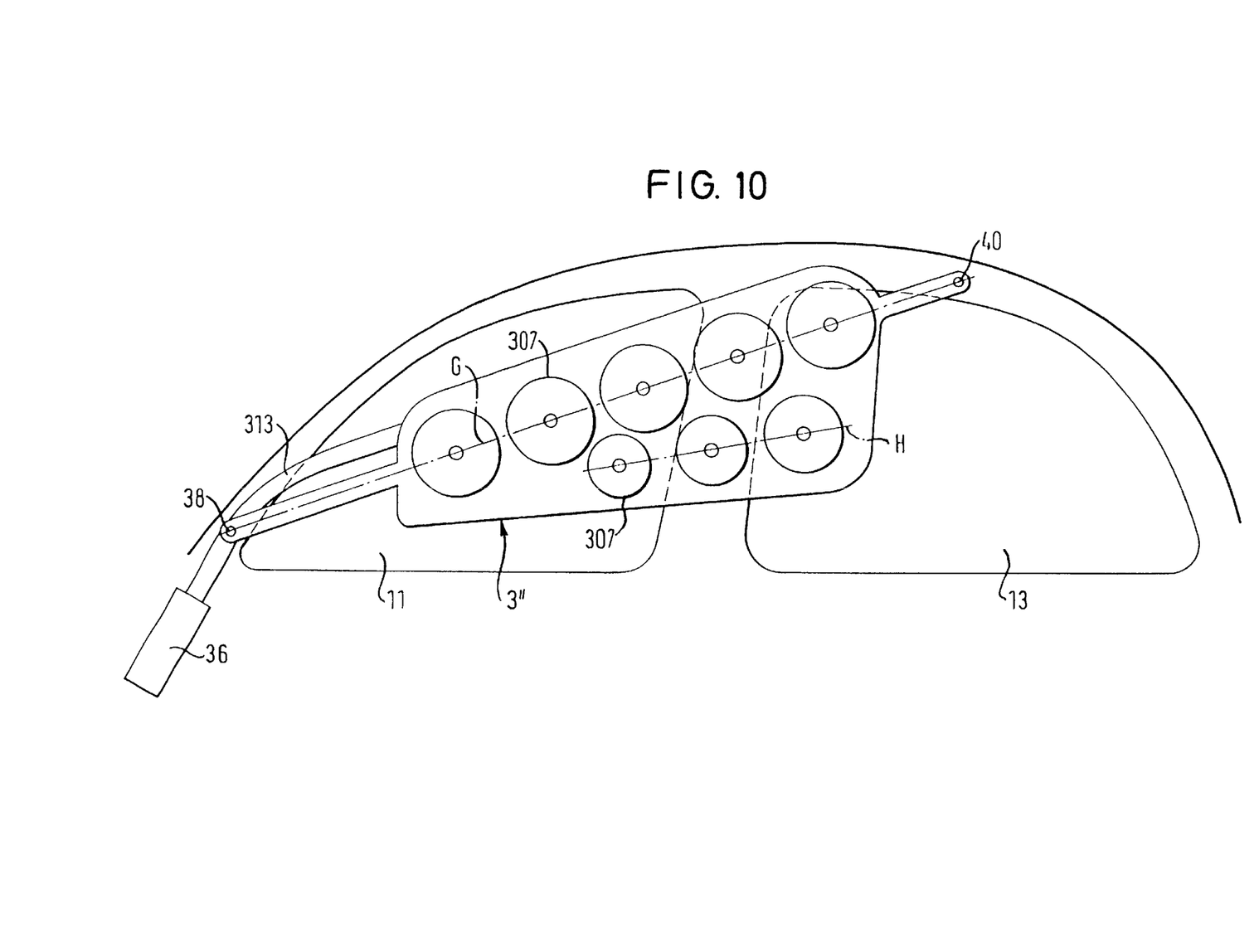
FIG. 10 shows a further embodiment of a head/side gas bag protective device according to the invention for the front occupant in installed, inflated state.

In the embodiment illustrated in FIG. 10, the gas bag extends still further in the direction of the side window 13 and partially covers it. The gas bag is also constructed having a larger area and in addition to the row of spacers which lie on the straight connecting line G, has a second row of spacers which lie on a straight line H. These spacers are also characterized by a ring shape (see rings 307). The straight lines G, H can run parallel to each other or, as in FIG. 10, at an acute angle to each other. The gas bag in FIG. 10 has the reference number 3".

Figure 11:
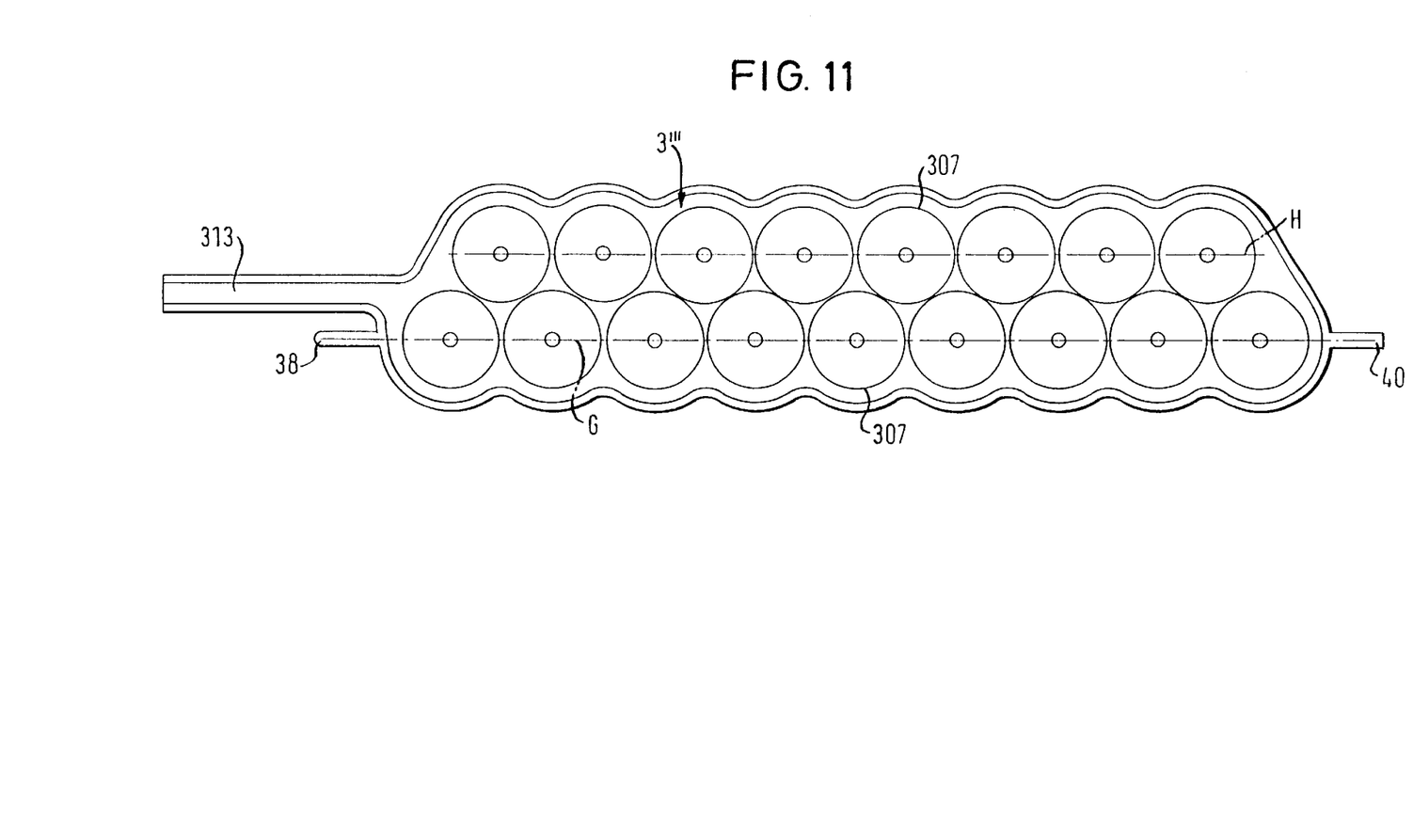
FIG. 11 shows a further embodiment of a head/side gas bag protective device according to the invention with a gas bag for the front- and the rear occupant.

The gas bag 3''' according to FIG. 11 is fastened with its anchoring points 38, 40 at the same height to the A-column and the C-column, so that it extends horizontally across the side windows 11, 13, which are not shown in FIG. 11. The entire chamber of the gas bag is passed through by spacers, which are arranged in two rows, one row which lies on the straight connecting line G and one row which lies on the straight line H parallel thereto. The rings 307 of both rows are staggered laterally with respect to each other, so that the rings 307 of the upper row project partially into the intermediate space between adjacent rings 307 of the lower row.

Figure 12:
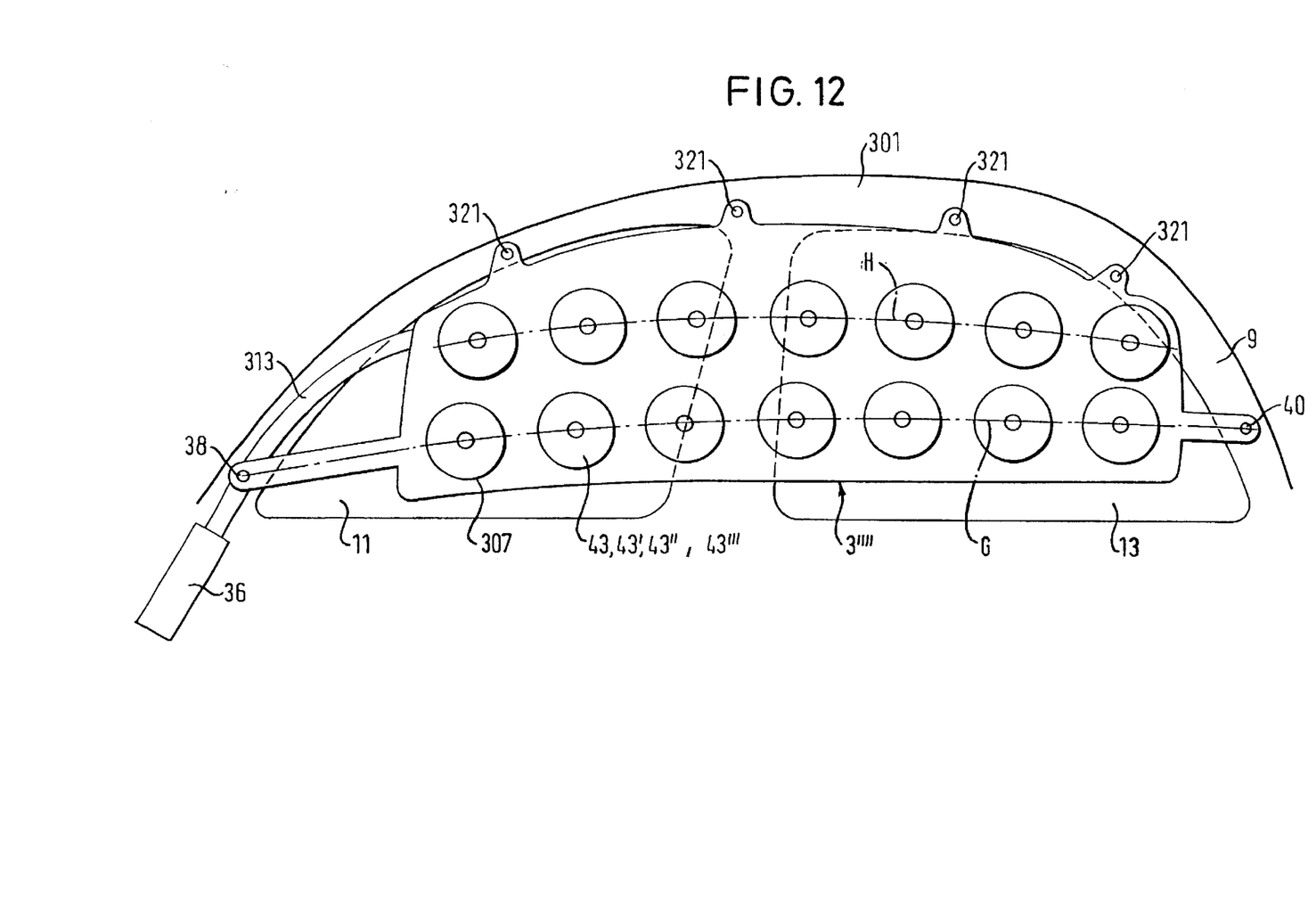
FIG. 12 shows a side view of a side gas bag protective device according to another embodiment.

As a variation of the embodiment illustrated in FIG. 11, FIG. 12 shows a gas bag 3"" having an even larger area, which in contrast to the embodiment according to FIG. 11 is also fastened at several points 321 to the roof frame 301 or to the upper end of the C-column 9. Also in this embodiment, numerous successive spacers are arranged in rows. Through the fastening on the roof frame 301 it is possible that the straight connecting line G and the straight line H become slightly bent connecting lines G, H.

Figures 13, 14:
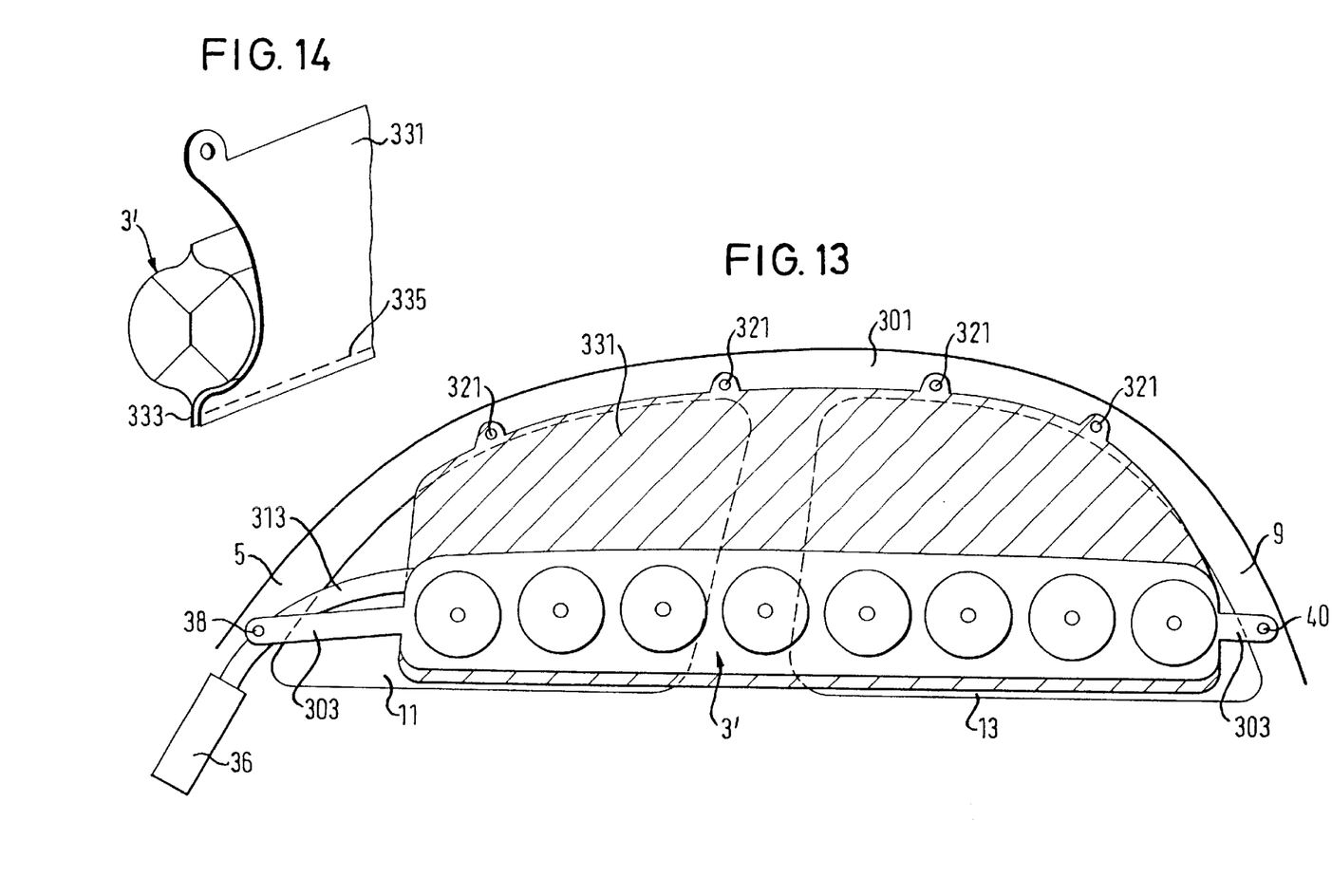
FIG. 13 shows a modification of the side gas bag protective device of FIG. 11.
FIG. 14 shows a perspective view of the side gas bag protective device according to FIG. 13 in partial sectional view.

The embodiment shown in FIG. 13 is a variation of the gas bag according to FIG. 8 which, however, extends parallel to the lower end of the side windows 11, 13 from the A-column 5 horizontally up to the C-column and is fastened to these. A non-inflatable fabric piece 331 is fastened to the gas bag 3' to form a restraining wall which is illustrated in hatched lines in FIG. 13. The fabric piece 331 is sewn to the lower longitudinal edge 333 of the gas bag 3', with reference number 335 designating the seam. The fabric piece 313 is connected at several points 321 with the roof frame or with the upper end of the C-column 9 and is likewise tensioned by the tensioning gas bag 3', so that a large restraining area is available.

The spacers shown in FIGS. 6 to 13 between the fabric layers can also be arranged, deviating from these embodiments, so that their entry- and exit points join to form an ellipse, the longer axis of which runs parallel or perpendicular to the lower edge of the gas bag. Through this arrangement, a further possibility is produced for varying the anchoring behavior between the anchoring points. To coordinate the anchoring behavior in longitudinal direction of the gas bag (between the anchoring points) and perpendicular thereto, the longer axes of the ellipses thus formed can also assume a defined angular position between the alignment running parallel to the lower edge and the alignment running perpendicular thereto.

It is possible, in addition, in the embodiments described in FIGS. 6 to 13, to align the spacers in an analogous manner to the embodiments according to FIGS. 2 to 5, so that the entry- and exit points in the respective fabric layer lie substantially on a straight line or a slightly curved line and hence the anchoring effect has a specific orientation, which can therefore be adapted to the installation conditions.

What is claimed is:

1. A gas bag protective device, comprising a gas bag (3; 3' to 3"") made of
    at least two opposite fabric layers (15, 17), which delimit at least one chamber (25 to 33) able to be filled with gas,
    the fabric layers (15, 17) consisting of warp- and weft threads (19, 119; 119'; 219; 219'; 21, 121, 221), the gas bag
    having at least one spacer (43; 43' to 43"") which is connected with the fabric layers (15, 17) and in an inflated state limits the spacing of the fabric layers (15, 17) from each other, and
    having at least two anchoring points at which it is to be fastened to a vehicle and between which it is tensioned in the inflated state, characterized in that
    the spacer is provided on a straight connecting line (G) connecting the anchoring points and brings about a tensioning of the gas bag between the anchoring points,
    the spacer (43; 43' to 43"") being formed by some of the warp- or weft threads (19, 119; 119'; 219; 219'; 21, 121, 221) which leave an area formed by their associated fabric layer (15, 17) and extend in the direction toward the opposite fabric layer (17 and 15, respectively) and are connected with warp- or weft threads (19, 119; 119'; 219; 219'; 21, 121, 221) of the opposite fabric layer (17 and 15, respectively).

2. The gas bag protective device according to claim 1, characterized in that the warp- or weft threads (19, 119; 119'; 219; 219'; 21, 121, 221) functioning as the spacer (43; 43", 43''') leave the area formed by their associated fabric layer (15, 17) and, after formation of the spacer (43, 43", 43'''), merge into the opposite fabric layer (17 and 15, respectively).

3. The gas bag protective device according to claim 1, characterized in that the warp- or weft threads (19, 119; 119'; 219; 219'; 21, 121, 221) functioning as the spacer (43', 43'''') leave the area formed by their associated fabric layer (15, 17) to form the spacer (43', 43'''') and, after formation of the spacer (43', 43''''), merge again into the fabric layer (15, 17) associated with them.

4. The gas bag protective device according to claim 1, characterized in that some of the warp- or weft threads (19, 119; 119'; 219; 219'; 21, 121, 221) of the two opposite fabric layers (15, 17) leave the area formed by their associated fabric layer (15, 17) in the direction toward the opposite fabric layer (17 and 15, respectively) and, for the common formation of the spacer (43' to 43'''') between the fabric layers (15, 17), are connected with each other at least in sections in a region (61 to 61") of the spacer (43' to 43'''').

5. The gas bag protective device according to claim 4, characterized in that the connection in the region (61 to 61") of the spacer (43' to 43'''') is a woven connection.

6. The gas bag protective device according to claim 4 characterized in that the warp- or weft threads (19, 119; 119'; 219, 219'; 21, 121, 221) forming the spacer (43, 43' to 43''''), in the inflated state of the gas bag and viewed in cross-section, form an H-, X-or Y-shape.

7. The gas bag protective device according to claim 6, characterized in that the spacer has the H-shape and for the formation of the H-shape the warp- or weft threads (19, 119; 119'; 219; 219'; 21, 121, 221) coming from opposite fabric layers (15, 17) and forming the spacer (43', 43") extend towards each other and, for the formation of a connecting leg of the H-shape, are interwoven in a region (61) and finally run to the fabric layer associated with them or to the opposite fabric layer (15, 17) and merge into it.

8. The gas bag protective device according to claim 6, characterized in that the spacer has the X-shape and for the formation of the X-shape the warp- or weft threads (19, 119; 119'; 219; 219'; 21, 121, 221) coming from opposite fabric layers (15, 17) and forming the spacer (43) extend towards each other and past each other and finally merge into the opposite fabric layer (17 and 15, respectively).

9. The gas bag protective device according to claim 6, characterized in that the spacer has the Y-shape and a central web (61''') of the Y-shape is formed by the warp- or weft threads (19, 119; 119'; 219; 219'; 21, 121, 221) of one fabric layer (17).

10. The gas bag protective device according to claim 6, characterized in that the spacer has the Y-shape and a central web (61') of the Y-shape is formed by warp- or weft threads (19, 119; 119'; 219; 219'; 21, 121, 221) which are connected with each other and come from opposite fabric layers (15, 17), which layers in the region of a V-shaped section of the Y-shape run separated from each other.

11. The gas bag protective device according to claim 1, characterized in that at least one of the fabric layers (15, 17) is coated at least in the region of the spacer (43, 43' to 43'''').

12. The gas bag protective device according to claim 11, characterized in that the gas bag is coated by a foil (41) which is applied externally.

13. The gas bag protective device according to claim 1, characterized in that the gas bag has several chambers (25 to 33) and the spacer (43, 43' to 43'''') is provided inside one chamber (27 to 33).

14. The gas bag protective device according to claim 1, characterized by a gas generator (36), the gas generator (36) and the gas bag (3 to 3'''') being coordinated with each other such that with a fully inflated gas bag (3 to 3'''') the threads forming the spacer (43 to 43'''') emerge at an angle ($\alpha$) between 35° and 55° from the fabric layer associated with them, to extend in the direction toward the opposite fabric layer.

15. The gas bag protective device according to claim 1, characterized in that exit points or entry points (71), at which the threads forming the spacer (43 to 43'''') run from or into one of the fabric layers, complement each other to form a ring (307, the ring having a dome-shaped or spherical segment-shaped form in the inflated state of the gas bag.

16. The gas bag protective device according to claim 15, characterized in that the exit points or entry points (71) complement each other to form a circular ring.

17. The gas bag protective device according to claim 15, characterized in that on both fabric layers (15, 17) exit points or entry points (71) are provided, which complement each other to form a ring.

18. The gas bag protective device according to claim 17, characterized in that the rings (307) formed by the exit points or entry points (71) are congruent on the two fabric layers (15, 17).

19. The gas bag protective device according to claim 15, characterized in that a row of several successive rings (307) formed by the exit points or entry points is provided and that at least a second row is provided, likewise of several successive rings (307) formed by exit points or entry points (71), the rows running substantially parallel.

20. The gas bag protective device according to claim 19, characterized in that the rings (307) of adjacent rows are staggered laterally with respect to each other.

21. The gas bag protective device according to claim 1, characterized in that the spacer (43) extends in a linear manner over a section of the gas bag.

22. The gas bag protective device according to claim 1, characterized in that the gas bag is a side gas bag (3 to 3'''') which in the inflated state extends straight across at least one side window (11, 13) to protect the head of an occupant and is tensioned straight across the side window (11, 13), numerous spacers (43 to 43'''') being arranged in succession along the straight connecting line (G) which connects anchoring points (38, 40) at opposite longitudinal ends of the gas bag (3 to 3'''').

23. The gas bag protective device according to claim 22, characterized in that the straight connecting line (G) lies in the region of an inflatable chamber.

24. The gas bag protective device according to claim 23, characterized in that the warp- or weft threads run parallel to the straight connecting line (G).

25. The gas bag protective device according claim 22, characterized in that the gas bag (3'; 3") has anchoring points (38, 40) for fastening to an A-column (5) and for fastening to a roof frame (301).

26. The gas bag protective device according to claim 25, characterized in that the gas bag (3'; 3") is elongated and tubular.

27. The gas bag protective device according to claim 22, characterized in that the gas bag (3; 3'; 3''') extends from an A- to a C-column (5, 9) of the vehicle and has anchoring points (38, 40) for fastening to the A-column and to the C-column (5, 9) and that the straight connecting line (G) extends substantially along a lower edge of the gas bag (3; 3'; 3''') in relation to the inflated state.

28. The gas bag protective device according to claim 27, characterized in that further spacers (43' to 43'''') are provided between the spacers (43' to 43'''') running along the lower edge of the gas bag and an upper edge of the gas bag (3''') in the inflated state.

29. The gas bag protective device according to claim 27, characterized in that the gas bag (3') has an elongated, tubular shape from the anchoring point (38) on the A-column (15) to the anchoring point (40) on the C-column and a non-inflatable restraining wall is tensioned between it and a roof frame (301).

30. A gas bag protective device, comprising a gas bag made of
- at least two opposite fabric layers, which delimit at least one chamber able to be filled with gas,
- the fabric layers consisting of warp and weft threads, the gas bag
- having at least one spacer which is connected with the fabric layers and in an inflated state limits the spacing of the fabric layers from each other, and
- having at least two anchoring points at which it is to be fastened to a vehicle and between which it is tensioned in the inflated state, characterized in that
    - the spacer is provided on a straight connecting line connecting the anchoring points and brings about a tensioning of the gas bag between the anchoring points,
    - the spacer being formed by some of the warp and weft threads which leave an area formed by their associated fabric layer and extend in the direction toward the opposite fabric layer and are connected with warp and weft threads of the opposite fabric layer.

* * * * *

UNITED STATES PATENT AND TRADEMARK OFFICE
CERTIFICATE OF CORRECTION

PATENT NO.    : 6,398,253 B1
DATED         : June 4, 2002
INVENTOR(S)   : Jurgen Heigl It is certified that error appears in the above-identified patent and that said Letters Patent is hereby corrected as shown below:

Title page,
Item [22], Filed:, delete "Dec. 18, 2000" and insert -- August 31, 2000 --.

Signed and Sealed this

Eleventh Day of November, 2003

JAMES E. ROGAN
*Director of the United States Patent and Trademark Office*